(12) United States Patent
Walkner et al.

(10) Patent No.: US 11,442,022 B2
(45) Date of Patent: Sep. 13, 2022

(54) METHOD FOR READING AN IMAGE SENSOR

(71) Applicant: B&R Industrial Automation GmbH, Eggelsberg (AT)

(72) Inventors: Walter Walkner, Goeming (AT); Gerhard Beinhundner, Pischelsdorf (AT); Andreas Waldl, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 16/695,376

(22) Filed: Nov. 26, 2019

(65) Prior Publication Data

US 2020/0167895 A1 May 28, 2020

(30) Foreign Application Priority Data

Nov. 27, 2018 (EP) .................................... 18208542

(51) Int. Cl.
*G01N 21/88* (2006.01)
*H04N 5/345* (2011.01)

(52) U.S. Cl.
CPC ........ *G01N 21/8851* (2013.01); *H04N 5/3454* (2013.01)

(58) Field of Classification Search
CPC ........ G01N 21/8851; G01N 2021/8854–8896; H04N 5/345–3454; G06T 7/0002–001
See application file for complete search history.

(56) References Cited

U.S. PATENT DOCUMENTS

| 9,716,847 | B1 | 7/2017 | Muldoon | |
|---|---|---|---|---|
| 2007/0273766 | A1* | 11/2007 | Wilson | G01S 3/7864 348/169 |
| 2014/0347466 | A1* | 11/2014 | Hirano | H04N 5/374 348/87 |
| 2015/0326784 | A1* | 11/2015 | Hayashi | H04N 5/23245 348/220.1 |

(Continued)

FOREIGN PATENT DOCUMENTS

| DE | 10 2009 006 112 | 8/2009 |
|---|---|---|
| EP | 2 600 605 | 6/2013 |

(Continued)

OTHER PUBLICATIONS

Schrey et al., "A IK x IK High Dynamic Range CMOS Image Sensor Wiith On-Chip Programmable Region-of-Interest Readout," *IEEE Journal Of Solid State Circuits.* vol. 37, No. 7, XP-001221315, Jul. 2002, pp. 911-915.

(Continued)

*Primary Examiner* — Paul M Berardesca
(74) *Attorney, Agent, or Firm* — Greenblum & Bernstein, P.L.C.

(57) ABSTRACT

Imaging device and method for reading an image sensor in the imaging device. The imaging device has optics with which the imaging device can be focused on objects. The image sensor has a plurality of sensor lines, wherein each sensor line comprises a plurality of preferably linearly arranged, preferably individually readable pixel elements. A pixel range is defined with the pixel range comprising at least a section of a sensor line. The reading of the image sensor is restricted to the pixel elements (6) in the pixel range.

18 Claims, 5 Drawing Sheets

(56) References Cited

U.S. PATENT DOCUMENTS

2018/0114308 A1\* 4/2018 Herrmann .................. G06T 7/70
2018/0262696 A1\* 9/2018 Amano .............. A61B 1/00195
2019/0387149 A1\* 12/2019 Breisacher ............. H04N 5/232

FOREIGN PATENT DOCUMENTS

EP      10 2013 223 852      5/2015
EP               2 903 264    8/2015

OTHER PUBLICATIONS

Europe Search Report/Office Action conducted in counterpart Europe Appln. No. 182 08 542.3 (dated May 22, 2019).

\* cited by examiner

METHOD FOR READING AN IMAGE SENSOR

CROSS-REFERENCE TO RELATED APPLICATIONS

The present application claims priority under 35 U.S.C. § 119(a) of Europe Patent Application No. 18 20 8542.3 filed Nov. 27, 2018, the disclosure of which is expressly incorporated by reference herein in its entirety.

BACKGROUND

1. Field of the Invention

The present invention relates to a method for reading an image sensor in an imaging device, wherein the imaging device has optics with which the imaging device can be focused on objects, wherein the image sensor has a plurality of sensor lines and wherein each sensor line comprises a plurality of preferably linearly arranged, preferably individually readable pixel elements. Furthermore, the invention relates to an imaging device having at least one image sensor, wherein the image sensor has a plurality of sensor lines and wherein each sensor line comprises a plurality of preferably linearly arranged, preferably individually readable pixel elements, optics with which the imaging device can be focused on objects, and a control unit with which the values recorded by the pixel elements of the image sensor are read.

2. Discussion of Background Information

Numerous industrial applications require the use of complex optical sensor solutions, wherein in particular the implementation of machine vision systems is associated with a great deal of technical effort. On the other hand, an attempt is made to reduce the amount of data transmitted by the sensors to the central controller but also the amount of data processed by the sensor itself so as not to overload the transmission and computing capacities of existing systems. This is why there are a large number of applications on the market for which line sensors are preferably used. If, for example, the outer surface of a cylinder is to be captured, it can be scanned line by line if the angular position or rotational speed are known until an overall image of the outer surface has been obtained. Even for linear movements, such as those on a conveyor belt, a line sensor may be advantageous if, for example, objects are transported across a strip-like backlight that is provided. In this case, the line sensor is triggered by a transmitter. The use of line sensors is, however, somewhat inflexible and there are no line sensors available on the market that can be integrated into a central controller or drive system so that they can be synchronized with the movement of objects. Consequently, external clocks must be used, for example, for the activation.

Dark field illumination is usually used to be able to capture structures on a surface with a line sensor (if necessary, bright field illuminations are used as well). The dark field may be achieved, for example, by aligning the sensor substantially or approximately perpendicular with the object's surface to be captured and by arranging the lighting so that the object's surface is illuminated at an ideal shallow angle. On the other hand, the lighting may illuminate the object's surface in a substantially perpendicular manner whereby the camera focuses on the object's surface at a shallow angle. Any position between them may also be suitable depending on the respective application.

The angle between the lighting and the camera is particularly important when it comes to finding elevations and depressions on even or arched surfaces, such as scratches, cracks, material, production and/or display errors. This raises the problem that the optimum angle must be determined and set manually. On the one hand, this process is labor-intensive; on the other hand, it is difficult to reproduce and also error-prone.

DE 10 2009 006 112 A1 discloses a method and a device for checking objects with luminescent color patterns, in particular banknotes. The objects are illuminated with at least one radiation that excites the luminescence of the luminescence color pattern and then moved past a radiation sensor with which the luminescent radiation is captured, analyzed and evaluated. The emitted luminescent radiation is captured with an image sensor, wherein the individual lines of the image sensor are read separately from each other in rapid succession. The signal values of the pixels and/or lines exposed at predetermined time intervals are used to create a value or measurement curve of the intensity values of the excited luminescent radiation of the luminescence color patterns.

EP 2903264 A1 discloses a method for determining a light field of an object by an imaging device having an image sensor. The object is moved on an object plane spaced apart from the imaging device by a predetermined distance relative to the imaging device, wherein a plurality of single-line images of a particular object line are taken at different times and wherein the respective angle to the surface normal differs from one single-line images to the next. A light field data structure is created from the data of the single-line images.

SUMMARY

Embodiments of the present invention improve the prior art sensor solutions to provide higher flexibility and simpler application.

According to embodiments, in a method of the type referenced above, a pixel range is defined. The pixel range comprises at least a section of a sensor line and wherein the reading of the image sensor is restricted to the pixel elements in the pixel range. As a result of this restriction, the image sensors can be flexibly configured as different sensor units with the restriction to the pixel ranges also allowing for a higher acquisition rate because only a section of the image sensor has to be read which reduces the amount of data to be handled. The pixel range may preferably comprise any subset of the totality of the pixel elements of the image sensor. Optionally, the entirety of the pixel elements of the image sensor may be divided into subgroups (e.g. defined, for example, integer parts of sensor lines, in particular whole or half or quarter sensor lines), wherein the pixel range may comprise any subset of the entirety of the subgroups of the image sensor.

In the context of the present disclosure, the term "image sensor" refers to any device for the acquisition of two-dimensional, pixel-image-based images of light by electrical devices or elements. Therefore, examples of image sensors include, in particular, image sensors in which certain subgroups of pixel elements are readable simultaneously, such as CCD sensors and image sensors in which each pixel element is individually readable, such as CMOS image sensors.

In the context of the present disclosure, the term "light" is used for any electromagnetic radiation in the visible and the invisible range that is measurable with corresponding image sensors. Light therefore refers, in particular, to electromagnetic radiation in the visible spectrum, in the infrared range, in the UV range and in the X-ray range.

In an advantageous manner, the pixel range may comprise at least one complete sensor line. As a result, a single image sensor may render a plurality of linear sensors usable, each of which covers a specific linear area to be captured and has a specific angle of incidence. The parameterization is simplified as well.

In an advantageous embodiment, the definition of the pixel range may be defined on the basis of at least one image previously taken by the imaging device. This facilitates, for example, a largely autonomous adaptation of the selected pixel range to the prevailing conditions.

In a further advantageous embodiment, the definition of the pixel range may be based on a predetermined parameterization. This facilitates, for example, the integration of the imaging device in an automation system which provides the parameters for the parameterization.

The pixel range may advantageously comprise a contiguous section of the image sensor, or the pixel range may, if appropriate, have two or more spatially separated pixel sections. As a result, the imaging device can be used as a single sensor or as a group of several sensors, for example as a group of multiple linear sensors oriented in different directions.

In a further advantageous embodiment of the invention, the definition of the pixel range may be adapted to the potentially moving position of at least one object. The information about the position of the object may be detected, for example, by external or integrated sensors, by the imaging device itself or transmitted by a central controller. The pixel range may, for example, be read synchronously at a defined object position.

In a further advantageous embodiment, the definition of the pixel range may be changed dynamically. As a result, a "moving sensor position" may be realized without having to change the position of the imaging device. Optionally, moving objects may be "tracked" by the pixel range. This is done either by moving the image region that the pixel range is directed at on the object together with a fixed surface position or by having the image region "sweep over" a surface of the (moving or stationary) object to scan the surface of the object and, if necessary, create a corresponding image.

The term "dynamic" as used herein in the context means that the definition of the pixel range changes within a particular measurement task. The measuring task can be defined by the beginning and the end of the recording of continuous and related measurement data.

In a further advantageous embodiment of the invention, the definition of the pixel range for the imaging of a surface of an optionally moving object can be changed dynamically. This makes it possible, for example, to scan the surfaces of objects in a conveyor system for production errors without the object having to be brought into a special position or even stopped.

In a further aspect, embodiments of the present invention are directed to an imaging device of the type mentioned above which includes a pixel range encompassing at least one section of the image sensor defined by the control unit. The pixel range comprises at least a section of a sensor line and wherein the control unit limits the reading of the image sensor to the pixel elements in the pixel range. The imaging device facilitates an advantageous implementation of the method according to the invention.

Advantageously, the pixel range can be definable on the basis of at least one complete sensor line. This way, the imaging device can be used as a flexible line sensor (or as a plurality of line sensors).

In an advantageous embodiment, a program logic may be implemented in the control unit, which is suitable for defining the pixel range, in particular on the basis of at least one photograph previously taken by the imaging device. For example, a position with a maximum contrast can be determined on the basis of a photograph taken with the image sensor (full area), and the pixel range can then be adjusted for this position. The definition can be carried out in this manner either before the start of a specific measuring task and/or at regular or irregular intervals.

In a further advantageous embodiment, the control unit may have an interface with an external controller via which parameters for defining the pixel range can be received by the external controller. This allows for an autonomous, semi-autonomous or heteronomous operation of the imaging device. The term "autonomous" refers to the mode of operation that is used when the pixel range is defined according to predetermined parameters by the control unit of the imaging device itself. The term "partially autonomous" refers to the mode of operation that is used when the control unit receives parameters from an external controller, by which the position of the respective pixel range is calculated by the control unit of the imaging device. If appropriate, the control unit of the imaging device may also be operated in a heteronomous manner, i.e. directly as a function of the parameters received, in which case the pixel range is adjusted for the parameters predetermined by the external controller without any further calculation steps.

According to the invention, the pixel range may also be definable as a contiguous section of the image sensor and/or the pixel range may be definable as two or more spatially separate pixel subranges. As a result, a single imaging device may be used to define a plurality of "sensors" which are aligned in different directions, i.e. each covers a different area of the image.

According to an advantageous embodiment of the invention, the definition of the pixel range may be changed dynamically. The imaging device can thereby react, for example, to changed environmental conditions.

Advantageously, the definition of the pixel range may be adaptable to the possibly moving position of at least one object. The pixel range may thus be used to capture the surface of objects. Optionally, the pixel range may also be dynamically altered to "track" moving objects.

In an advantageous embodiment of the invention, the definition of the pixel range for detecting a surface of a possibly moving object may be dynamically changeable. In this case, the surface of stationary or moving objects may be "swept over" by the respective image region assigned to the pixel range, and an image of the surface of the object can be created (possibly from different viewing directions). These images can be used, for example, to create "developed" surface representations or 3d renderings of the object.

Other exemplary embodiments and advantages of the present invention may be ascertained by reviewing the present disclosure and the accompanying drawing.

BRIEF DESCRIPTION OF THE DRAWINGS

Below, the present invention is described in greater detail with reference to FIGS. 1 to 6 which, by way of example, show schematic and non-limiting advantageous embodiments of the invention. In the drawings.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
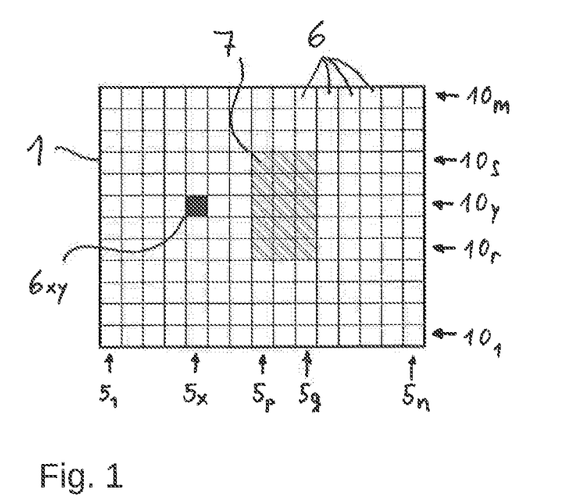
FIGS. 1 and 2 each show an image sensor of an imaging device according to the invention in a schematic representation.

FIG. 1 shows a plan view of an image sensor 1 of an imaging device 2 (see FIG. 3) according to the invention in a highly schematic and simplified representation, which serves, in particular, to explain the designations and reference signs used herein. It basically shows the photosensitive, rectangular surface of the image sensor 1. The other components of the image sensor 1 are not represented for reasons of clarity. The design and the technical functioning of such sensors are known to the person skilled in the art.

On the photosensitive surface of the image sensor 1, a plurality of individually readable pixel elements 6 are arranged in a grid of sensor lines 5 and sensor columns 10. The image sensor 1, for example, comprises "n" sensor lines 5 and "m" sensor columns 10. The number n and the number m can be freely selected according to customary sensor variables or customized for the particular case. Image sensors frequently used in the industrial sector are, for example, in the 4:3 format and in the resolutions n×m of 640×480, 1280×960, 1600×1200, etc. but also in other dimensions, for example, in the formats 1:1, 3:2, 5:4, 6:9 or other, special formats with different numbers of pixels from less than one megapixel to special formats with several thousand megapixels, available on the market or can be produced.

Each individual sensor line 5 can be uniquely identified by a number x between 1 and n, and each sensor column 10 can be uniquely identified by a number y between 1 and m. In FIG. 1, this is exemplified by the reference numerals of the sensor lines $5_l$, $5_p$, $5_x$, $5_q$ and $5_n$, and the reference numerals of the sensor columns $10_l$, $10_r$, $10_y$, $10_s$ and $10_m$. Accordingly, each pixel element 6 with the numbers of a particular sensor line $5_x$ and a certain sensor column $10_y$ can be clearly identified as shown, for example, in FIG. 1 by the sensor element $6_{x,y}$.

Each pixel element 6 may comprise either a single light sensor or a cooperating group of light sensors, for example, for different spectral ranges.

The present invention is based, inter alia, on a definition of regions of the image sensor, such as the rectangular pixel range 7 shown hatched in FIG. 1. The pixel range 7 may comprise an arbitrary partial selection of all pixel elements $6_x$ with the definition in the case of a rectangular pixel range 7 being given, for example, by an initial sensor line $5_p$, an end sensor line $5_q$, an initial sensor column $10_r$ and an end sensor column $10_s$ being clearly definable.

According to the present disclosure, a pixel range 7 need not necessarily have a rectangular contiguous shape but may be composed of any combination of rectangular pixel subranges 9 as will be explained with reference to the illustration in FIG. 2.

Figure 2:
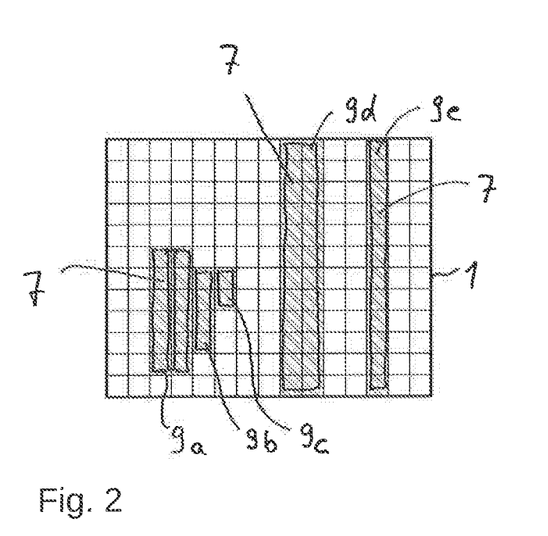

The pixel range 7 shown in FIG. 2 comprises the three contiguous, respectively rectangular pixel subranges 9a, 9b and 9c as well as the two pixel subranges 9d and 9e, which are separated from them and from each other. The two latter pixel sections 9d and 9e each extend over the entire length of the line, i.e., across all sensor columns $10_l$ to $10_m$.

The pixel arrangement of the image sensors 1 described here is based in each case on a "classical" checkerboard-like pixel geometry in which all pixel elements have the same size (for example, in the sense of a conventional Bayer matrix). Such an arrangement is based on image sensors that are most common on the market, but there are also alternative layouts in which pixel elements of different sizes can be provided (e.g. in the arrangement referred to as the "X-transmatrix") or in which the pixel elements are arranged in the pattern that deviates from the checkerboard pattern, for example, in pixel groups of fives or diagonally. In such cases, the definition of the pixel range 7 should be adjusted accordingly, which is within the skills of an average person skilled in the art.

Figure 3:
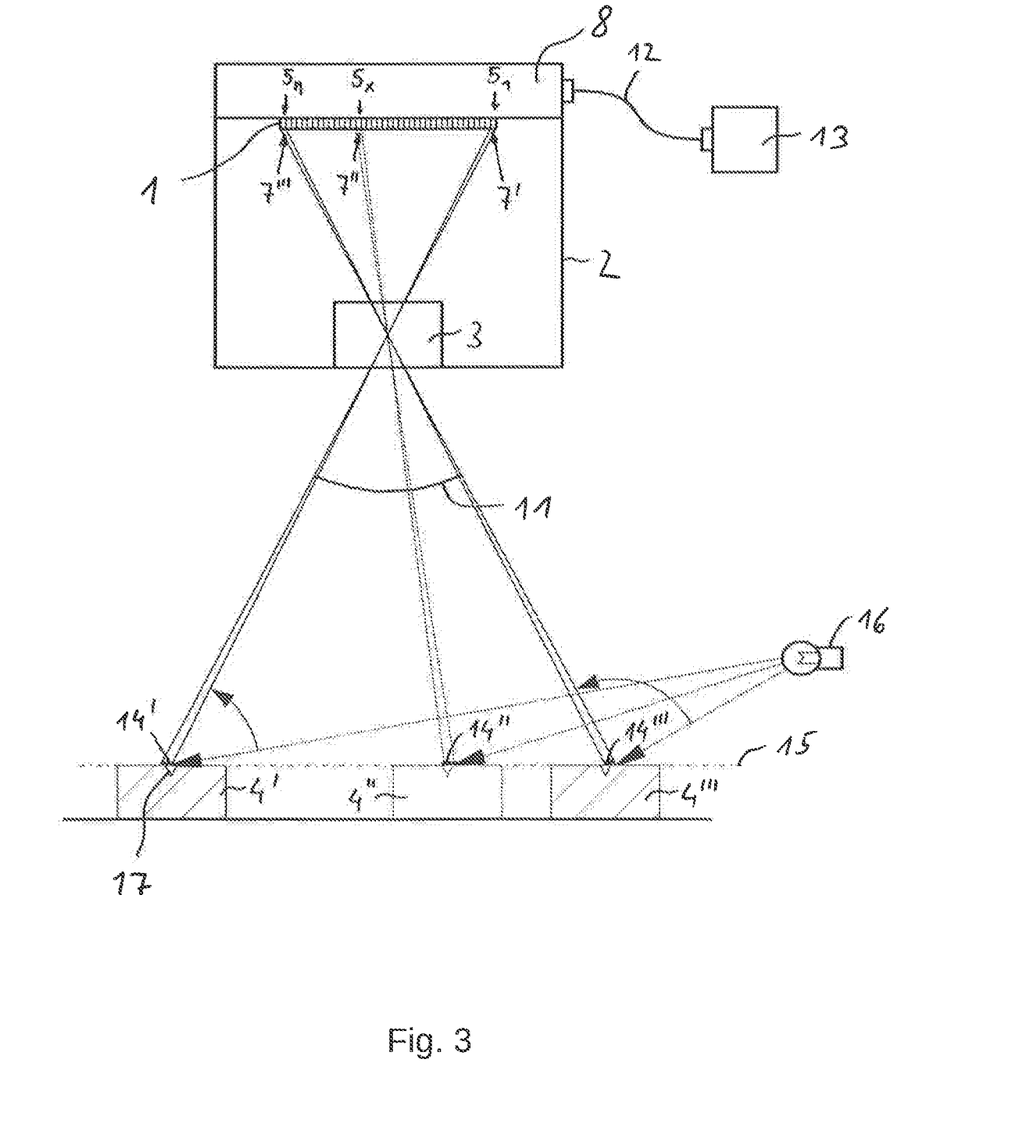
FIGS. 3 to 5 show a schematic representation of an imaging device according to the invention which is arranged for the optical monitoring of objects, wherein methods according to the invention are explained.

According to the disclosure, an imaging device 2 according to the invention shown, for example, in FIG. 3 comprises at least one image sensor 1, at least one optics 3 and one control unit 8. According to the design described above, the image sensor 1 has a plurality of sensor lines 5 with each sensor line 5 comprising a plurality of preferably linearly arranged, individually readable pixel elements 6. With the optics 3, the imaging device 2 can be focused on objects 4, which are located in an imaging area 11. The focusing can be done in a known manner by adjusting a lens arrangement in the optics 3 and/or by arranging the imaging device 2 at a distance that corresponds to the objects 4 to be captured.

The values recorded by the pixel elements 6 of the image sensor 1 can be read by the control unit 8. In the illustration shown in FIG. 3, the image sensor 1 is arranged directly on the control unit 8. The control unit 8 makes it possible to define a pixel range 7 comprising at least one section of the image sensor 1 with the control unit 8 limiting the reading of the image sensor 1 exclusively to the pixel elements 6 in the pixel range 7. The pixel range 7 can be defined in particular in the forms described in connection with FIGS. 1 and 2, wherein the definition may preferably comprise an arbitrary subgroup of the totality of the pixel elements 6 provided on the image sensor 1. Alternatively, in order to simplify the parameterization, the definable pixel range 7 may be limited to specific pixel groups. The control unit 8 may, in particular, use an arbitrary selection of entire sensor lines 5 to define the pixel range 7, which facilitates the parameterization and enables the use of, for example, image sensors that read line by line such as CCD sensors. Each sensor line 5 (or each group of adjoining sensor lines 5) of the pixel range 7 can represent a type of "linear sensor," which is focused on the imaging area 11 in a defined direction. Alternatively, the possible definition of the pixel range 7 may also be limited to sections of the sensor line, for example, to an "upper" or "lower" half of a sensor line 5, or the like.

Since the control unit 8 does not have to read the entirety of all the pixel elements 6 of the image sensor 1 but only has to process the pixel elements 6 within the pixel ranges 7, the amount of data to be processed and optionally transmitted can be considerably reduced, which can then be used, for example, to increase the acquisition frequency.

The pixel range 7 can either be determined directly by the control unit 8 provided in the imaging device 2 on the basis of defined algorithms, or it can be based on parameters, which are transmitted from an external control device 13 via an interface 12. The interface 12 may include, for example, an industrial bus system. The controller may, for example, be a computer programmed with appropriate software or a programmable logic controller (PLC) or other automation component. The imaging device 2 can be integrated into industrial applications by the interface 12. If necessary, the interface 12 can communicate via the bus system, which is also used by the automation component for the control of other system parts.

The pixel range 7 can either be defined invariably for a specific application, but it can also be changed dynamically, i.e., within a specific measurement task, which makes it possible to perform a plurality of advantageous processes, which are described below.

FIG. 3 depicts three pixel ranges 7 by way of example, which are identified for differentiation purposes with respective overlines as pixel ranges 7', 7" and 7'". In this case, each pixel range 7', 7" and 7'" comprises all pixel elements 6 of a sensor line 5, in particular the first pixel range 7' comprises the pixel elements 6 of the first sensor line $5_j$, the third pixel range 7'" comprises the pixel elements of the last sensor line $5_n$ and the second pixel range 7" comprises the pixel elements 6 of intermediate sensor line $5_x$. Due to the dimensions of the image sensor 1 on the one hand and the dimensions, properties and relative orientation of the optics 3 on the other hand, the imaging area 11 is defined for the imaging device 2, wherein the optics 3 is focused on a specific measurement plane 15 and defines a substantially rectangular measuring range in this measurement plane 15. With a corresponding depth of field, it is also possible, if necessary, to detect with sufficient accuracy the regions, which are arranged above the measurement plane 15 (i.e., closer to the optics 3) and below the measurement plane 15. Each pixel range 7', 7" and 7'" defines a corresponding image region 14', 14", 14'" in the measurement plane 15, which is captured by the pixel elements 6 in the respective pixel range 7', 7" and 7'". Particularly image regions 14 close to the edges, such as the two outermost image regions 14' and 14'" may subjected to a distortion due to aberrations, in particular the distortion of the optics 3, which, if necessary, may be considered and/or deducted by the control unit 8 (or the external controller 13).

In the case illustrated in FIG. 3, the (linear) pixel ranges 7', 7" and 7'" each define a linear sensor, wherein the image regions 14', 14", 14'" of these linear sensors are each focused on the measurement plane 15 at a different angle. This is particularly relevant in connection with an illumination of the measurement plane 15. FIG. 3 shows by way of example a lighting unit 16, which in the manner of a dark field illumination, illuminates the measurement plane 15 at a flat angle. The lighting unit 16 may optionally be synchronized with the imaging frequency of the imaging device 2. Due to the flat angle of incidence, features on an object 4, for example, a notch 17 or a scratch on its surface, each have a different reflection behavior when illuminated by the lighting unit 16 depending on the position of the image region 14', 14", 14'". Therefore, the notch 17 is captured by the imaging device 2 with a different contrast, depending on the position the object 4.

For many applications, it is necessary to maximize this contrast, which, according to the invention can be achieved, for example, by first carrying out a reference measurement with the entire image sensor 1 while a reference object with known features (such as the notch 17 shown in FIG. 3) is arranged in the measurement plane 15 or is moved through it. By evaluating this reference measurement, the position that promises the maximum contrast can be determined and the pixel range can be adjusted accordingly. This evaluation can be carried out either autonomously by the imaging device 2 or under the control of the external control unit 12. An analogous procedure may also be advantageously used with bright field illumination or with transmitted light images. Instead of the flat dark field illumination provided by the illumination unit 16, for example, an (LED) ring lamp could be used, which is arranged around the optics 3 and illuminates the measurement surface 15 from the direction of the imaging device 2.

If the position of the object 4 of the imaging device 2 (or the external controller 13) is known, it is also possible to "track" certain features on the object 4 with a moving image region 14 by dynamically changing the corresponding pixel range 7 on the image sensor 1 while the object 4 moves through the imaging area 11. (This is shown in FIG. 3 by the positions of the object 4 designated as 4', 4" and 4'"). This way, multiple images of a single region can be obtained under different lighting conditions. This method can also be used to move a reference object having a known surface deviation (such as the notch 17 shown in FIG. 3) through the imaging region 11 and to track the surface deviation with the image region 14. This makes it possible to determine a position for the pixel range 7, which promises maximum contrast for the further measurement.

In addition to the determination of an optimal measuring position described above, the imaging device 2, according to the invention, can also perform more complex processes. It is possible, for example, to use the different imaging directions that can be generated with the (fixed) imaging device 2 to scan surfaces of moving objects, as explained with reference to FIG. 4. An object 4 moves through the imaging area 11, for example, linearly and at a known speed. The successive positions of the object 4 are identified in FIG. 4 with the reference numerals 4'. 4", 4'" and 4"". In the first position (object 4'), the object enters the imaging area 11. The pixel range 7 is set to the first sensor line 5, at this time by the external controller 13 or by the control unit 8 in the form of a line sensor. While the object is moving through the imaging area 11, the pixel range 7 is also changed in such a way that the corresponding image region 14 is moved with the object 4 but at a slower speed than the object 4. The pixel range 7 is changed dynamically across the entire imaging period so that the last image region 14"" detects the rear end of the object 4"" at the time at which the object 4 leaves the imaging area 11.

Figure 4:
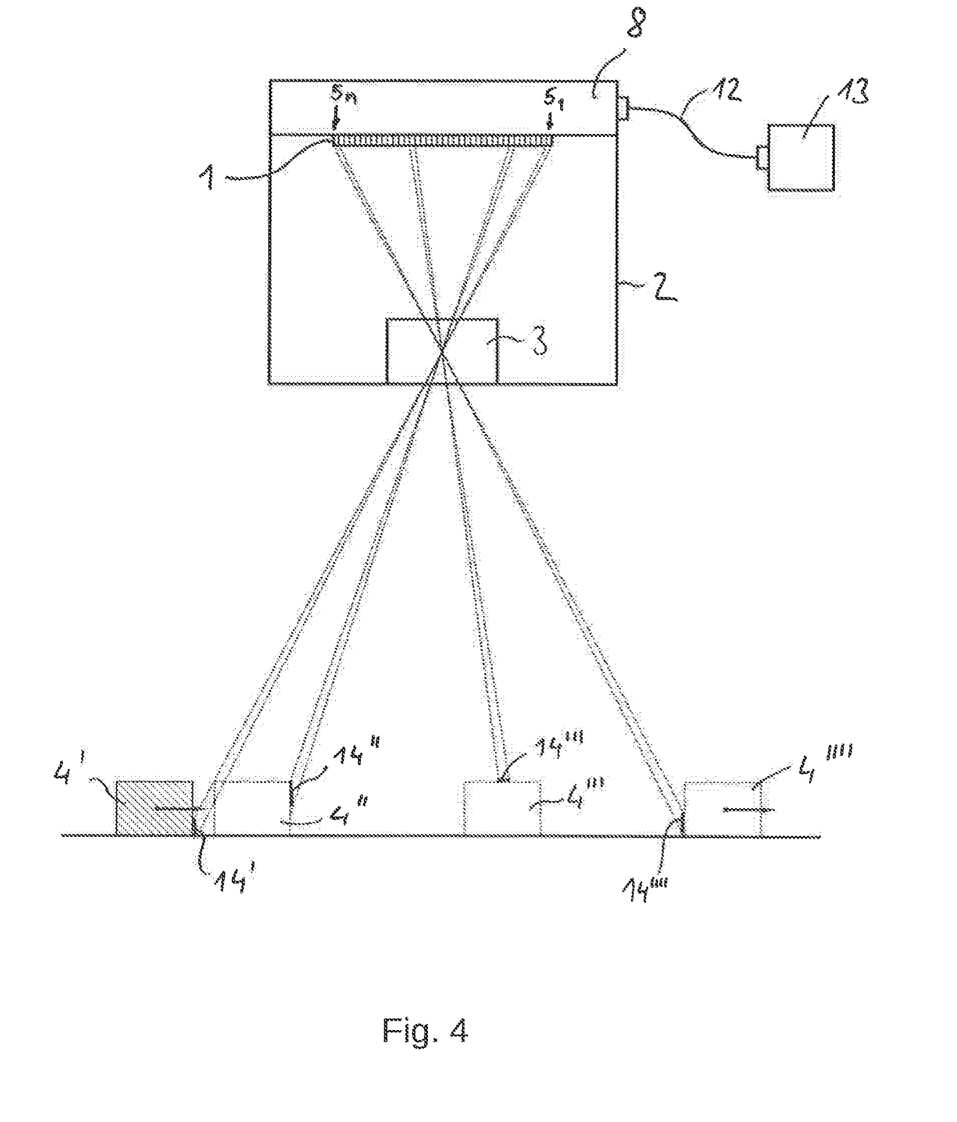

Due to the relative movement between the image region 14 and the object 4, the individual images captured in the respective successive pixel ranges 7 can be combined to form a complete image of the surface of the object. It should be noted that the front and back can be depicted in their entirety due to the imaging angle, which is not possible with a snapshot. For example, in the case of a uniform movement of object 4 and pixel range 7, the front and back image would be distorted compared to the image of the planar surface, but this distortion can be determined with the help of known arithmetic methods and, if necessary, calculated from an overall representation of the image.

Figure 5:
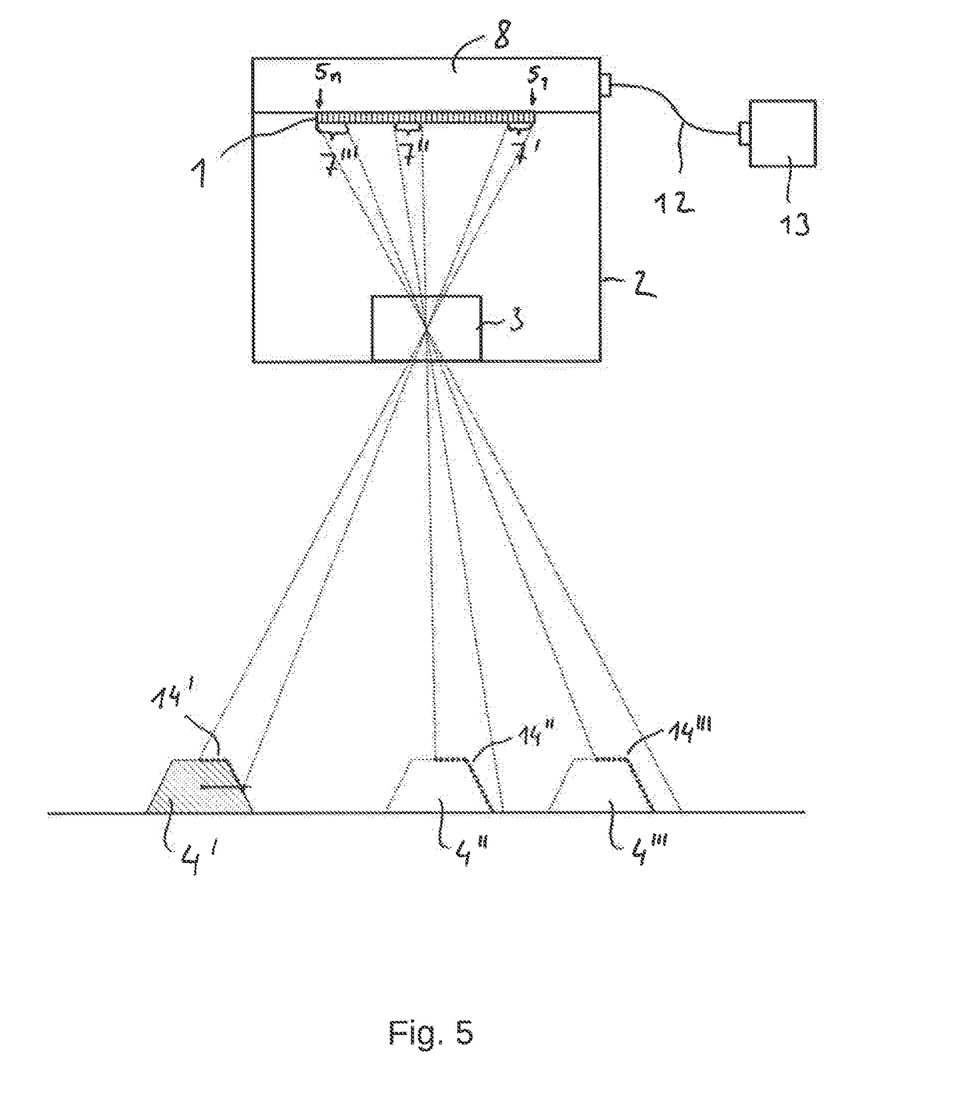

A further example of a method, which can be carried out with the image acquisition unit 2 according to the invention, is shown schematically in FIG. 5. Again, the pixel range 7 (shown in positions 7', 7", 7'") is dynamically focused on an object 4 (positions 4', 4", 4'") as the object passes through the imaging area 11. In contrast with the example described above, however, the pixel range 7', 7", 7'" always comprises a plurality of sensor lines 5 so that an image matrix is generated with each individual image. Furthermore, the speed with which the pixel range 7 is moved is matched to the speed of the object 4 so that the same part of the object 4 (in the case the front, upper edge) is always located substantially in the center of the corresponding image region 14', 14", 14'". Since the same area of the object 4 was thus captured from different lines of sight, a 3d model of the monitored area or of the entire object 4 can be created by comparing the images without the imaging device 2 having to be moved or pivoted for this purpose.

The linear and constant movement of the objects 4 that the representations of FIG. 3 to 5 are based on is used, in particular, for a better understanding and simplification of the description. It is clear that the methods and devices according to the invention can also be used for complex movements in one or more translatory or rotational axes.

Figure 6:
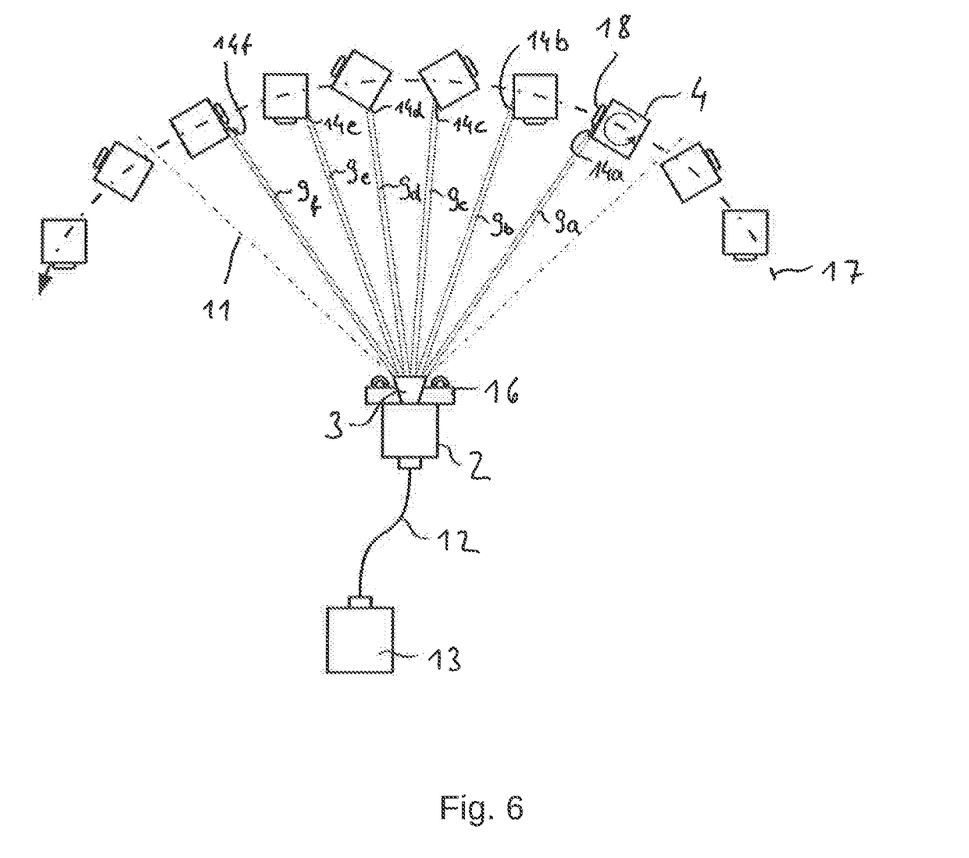
FIG. 6 shows a schematic representation of an imaging device according to the invention, which is provided for monitoring complex moving objects.

FIG. 6 shows a further example of an advantageous method, according to the invention, that can be executed with the imaging device 2. In this case, the surfaces of objects 4 are to be scanned with the imaging device 2, for example, to detect product or production defects, scratches, damage or the like. In prior art, usually each individual object 4 is stopped at a defined position in front of a linear scanner and, in this position, the object 4 is rotated around its axis so that the linear scanner can scan the entire circumference of the object 4 with the linear scanner. This method is not only a challenge for the transport device and the controller but is also very slow and inflexible since a changeover to objects with other shapes generally requires a reorganization of at least the entire measurement setup and often also a specific adjustment of the lighting.

In order to reduce this effort, the imaging device 2 shown in FIG. 6 is aligned with its imaging area 11 on the transport or movement path through which a plurality of objects 4 are transported or otherwise moved through the imaging area 11. In the illustrated case, the objects 4 move along a path 17 while additionally rotating around an axis normal to the image plane. The trajectory may be, for example, a conveyor belt used in a production, filling or packaging plant, and the objects may be, for example, semi-finished or finished products or packaging containers, such as bottles, boxes, pouches, packages or the like. Each object 4 may, for example, have a reference feature 18, wherein the reference feature 18 may be, for example, a label, a raised trademark or another product or packaging feature that is present on each object 4. The reference feature 18 is not mandatory but may facilitate the adjustment.

The imaging area 11 can be illuminated with an appropriate type of light or dark field illumination suitable for the respective case. In FIG. 6, an LED ring lamp is provided as illumination device 16, which is arranged around the lens or optics 3 of the imaging device 2 and which and illuminates the entire imaging area 11.

The movement of the objects along the path 17 may optionally be monitored and/or controlled by the central controller 13 (for example, a PLC or another automation unit), which also controls the imaging device 2, but other control structures may also be provided as well. In the illustrated case, the central controller 13 transmits parameters to the imaging device 2 via the interface 12. Based on these parameters, the imaging device 2 dynamically determines a corresponding pixel range 7, reads the measured values determined by the respective pixel elements 6 in the pixel range 7 according to the parameters and transmits the corresponding sensor data back to the central controller 13. The transmission may preferably be transmitted via the same interface 12 or in another way.

The pixel range 7 simultaneously comprises a plurality of pixel subranges 9a-9f with each pixel section 9a-9f being associated with a specific object 4. The pixel range 7 is substantially modified in real time so that each pixel sub-region 9a-9f (or the measuring area 14a-14f generated by this pixel subregion 9a-9f) is aligned with the object 4 associated therewith from the time when the object 4 enters the imaging area 11 until the time when the object 4 leaves the imaging area 11. Optionally, the object 4 may also be scanned only in a smaller subinterval of the imaging area 11. Each pixel subregion 9a-9f may, for example, be formed as a linear sensor and comprise one or more adjoining sensor lines 5 of the image sensor 1 of the imaging device 2, as already described in connection with the embodiments above.

Since, in addition to the translational movement along the path 17, each object 4 also performs a rotation around its own axis, it is possible to substantially completely image the outer surface of each object 4 through a correspondingly fast and accurate adjustment of the pixel subranges 9a-9f while it rotates within the imaging area 11. The reference feature 18 may be used to detect an orientation of the object 4 or to generate reference measurements with which, for example, the illumination and the exact alignment of the measurement areas 14 can be optimized. In the case of substantially cylindrical objects, it is possible, for example, to always align the measuring area 14 with the moving object 4 in such a way that the measurement of the entire cylindrical surface takes place substantially at a constant surface angle.

Optionally, the imaging device 2 may, in addition to the pixel range 7 which is dynamically changed in accordance with the above scheme, create complete images of the entire imaging area 11 at additional intervals, for example, in order to optimize the alignment of the measurement areas 14 or to generate additional measurement data. It is also possible, for example, to "film" the entire imaging area 11 after the system has started up or at regular intervals (where appropriate, the imaging frequency can be reduced accordingly, or only a partial selection of elements 6 across over the image sensor 1 pixel, for example, in a grid that selects every fifth pixel element, can be used to reduce the amount of data). Using an analysis of this film, it is then possible to create and implement an optimal strategy for the control of the measuring areas 14.

As described above, the definition of the respective static or dynamic pixel ranges 7 can be performed either by the control unit 8 of the imaging device 2 or by a central controller or by distributed roles in all embodiments. The central controller is able to control the definition of the pixel ranges 7 and other functions of the imaging device 2, for example, by transmitting parameters. Examples of such parameters include, inter alia, parameters which contain a direct definition of the pixel range 7 (i.e. the number, shape and size of the pixel subranges), parameters which enable the control unit 8 to determine a pixel range 7, i.e. a position indication of a region an image region 14, for example, parameters that define an exposure frequency, parameters that define exposure time, parameters that pertain to a focusing, parameters that define exposure time for a particular pixel range configuration, and parameters that pertain to the creation of the output data (for example, the creation of an image of the "rolled-off" of an object 4 based on the images of a moving pixel subregion, creation of a 3d model of an object, etc.).

The imaging device 2 according to the invention can also be advantageously used in other areas, for example, for monitoring any type of object, wherein the functionality of the definition of pixel ranges 7 can be combined with the imaging capabilities of the entire image sensor in any manner. It is possible, for example, to continuously film an imaging area 11 (optionally with a low imaging frequency or with only a few pixels distributed across the image sensor 1) and to detect movements, for example, by determining differential images. When certain movement patterns are detected, a specific sequence of images with static or dynamic pixel ranges 7 can then be initiated.

All embodiments of the imaging device described and the method steps disclosed here may be combined in any meaningful way. The intent of the invention is, in particular, to combine features described in connection with a particular embodiment with the other embodiments in any manner unless it is explicitly stated in the relevant text that such a combination is not intended or if such a combination is obviously impossible for technical reasons.

The method steps disclosed in the description and the claims can be defined in a program logic executable by the control unit 8 of the imaging device 2 and/or by the external controller 13, wherein the program logic executed by the control unit 8 or the external controller 13 enables the control unit 8 or the external controller 13 to execute the corresponding method steps.

A memory (not shown), e.g., a non-transitory computer readable medium or media, can be provided to store a set of instructions that can be executed by a processor of the control unit 8 to define pixel range 7 to limit reading of the image sensor and/or of external control device 13 so as to perform any of the methods or processes defined as computer based functions, either alone or in combination with the other described devices. The memory, accessible by the processor, can be part of control unit 8 and/or part of external control device 13 and/or remote from control unit 8 and/or external control device 13, e.g., a remotely located server, memory, system, or communication network or in a cloud environment.

Moreover, in addition to the foregoing, it is to be understood and those skilled in the art will readily appreciate that the blocks and/or modules illustrated in the drawings, e.g., control unit 8 and/or external control device 13 are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. Further, these blocks and/or modules can be formed as application specific integrated circuits (ASICs) or other programmable integrated circuits, and, in the case of the blocks and/or modules, which can be implemented by microprocessors or similar, they may be programmed using software (e.g., microcode) to perform various functions discussed herein and may optionally be driven by firmware and/or software. Alternatively, each block and/or module may be implemented by dedicated hardware, or as a combination of dedicated hardware to perform some functions and a processor (e.g., one or more programmed microprocessors and associated circuitry) to perform other functions.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE NUMERALS

Image sensor 1
Imaging device 2
Optics 3
Objects 4
Sensor lines 5
Pixel elements 6
Pixel range 7
Control unit 8
Pixel subranges 9
Sensor columns 10
Imaging area 11
Interface 12
Controller 13
Image region 14
Measurement plane 15
Lighting unit 16
Path 17
Reference feature 18

What is claimed:

1. A method for reading an image sensor in an imaging device, wherein the imaging device has optics, with which the imaging device focuses on objects, the image sensor has a plurality of sensor lines and each sensor line comprises a plurality of pixel elements, the method comprising:
   defining a pixel range comprising at least one section of at least one of the plurality of sensor lines,
   focusing the optics on a measurement plane in an imaging area;
   moving the objects through the imaging area,
   wherein, as the objects move through the imaging area, a reading of at least a portion of the objects along the measurement plane by the image sensor is limited to pixel elements in the pixel range,
   carrying out a reference measurement while a reference object with known features is moved through the measurement plane; and
   determining a position that promises maximum contrast by evaluating the reference measurement,
   wherein the pixel range is defined on a basis of the determined position.

2. The method according to claim 1, wherein the pixel range comprises at least one entire sensor line.

3. The method according to claim 1, wherein the pixel range comprises at least one of a contiguous section of the image sensor or two or more pixel subranges that are spatially separated from one another.

4. The method according to claim 1, wherein the defined pixel range is adapted to a moving position of at least one object.

5. The method according to claim 1, wherein the defined pixel range is dynamically changed.

6. The method according to claim 5, wherein the defined pixel range for detecting a surface of a moving object is dynamically changed.

7. An imaging device comprising:
at least one image sensor comprising a plurality of sensor lines, wherein each of the plurality of sensor lines comprises a plurality of pixel elements,
optics, with which the imaging device focuses on a measurement plane in an imaging area,
a path along which objects are movable so that at least portions of the objects are arranged in the measurement plane; and
a control unit configured to read values recorded by the pixel elements of the image sensor,
wherein the control unit defines a pixel range comprising at least one section of the image sensor, the pixel range comprising at least a section of at least one of the plurality of sensor lines,
wherein the reading of the image sensor by the control unit is limited to pixel elements in the pixel range,
wherein the control unit carries out a reference measurement while a reference object with known features is moved through the measurement plane,
wherein the control unit determines a position that promises maximum contrast by evaluating the reference measurement, and
wherein the pixel range is defined on a basis of the determined position.

8. The imaging device according to claim 7, wherein the pixel range is defined on a basis of at least one complete sensor line.

9. The imaging device according to claim 7, wherein a program logic defining the pixel range on the basis of the at least one image previously taken by the imaging device is implemented in the control unit.

10. The imaging device according to claim 7, wherein the control unit has an interface with an external controller via which the external controller receives parameters for defining the pixel range.

11. The imaging device according to claim 7, wherein the pixel range is definable as at least one of a contiguous section of the image sensor, or two or more mutually spatially separate pixel subranges.

12. The imaging device according to claim 7, wherein the defined pixel range is dynamically changeable.

13. The imaging device according to claim 7, wherein the defined pixel range is adaptable to a moving position of at least one object.

14. The imaging device according to claim 7, wherein the defined pixel range for detecting a surface of a moving object is dynamically changeable.

15. The method according to claim 1, wherein the plurality of sensor lines comprise linearly arranged pixel elements.

16. The method according to claim 1, wherein the plurality of sensor lines comprise individually readable pixel elements.

17. The imaging device according to claim 7, wherein the plurality of sensor lines comprise linearly arranged pixel elements.

18. The imaging device according to claim 7, wherein the plurality of sensor lines comprise individually readable pixel elements.

* * * * *